Jan. 6, 1925.  1,521,873
A. A. DUNHAM
RENNET CASEIN AND PROCESS OF MAKING THE SAME
Filed Jan. 24, 1924
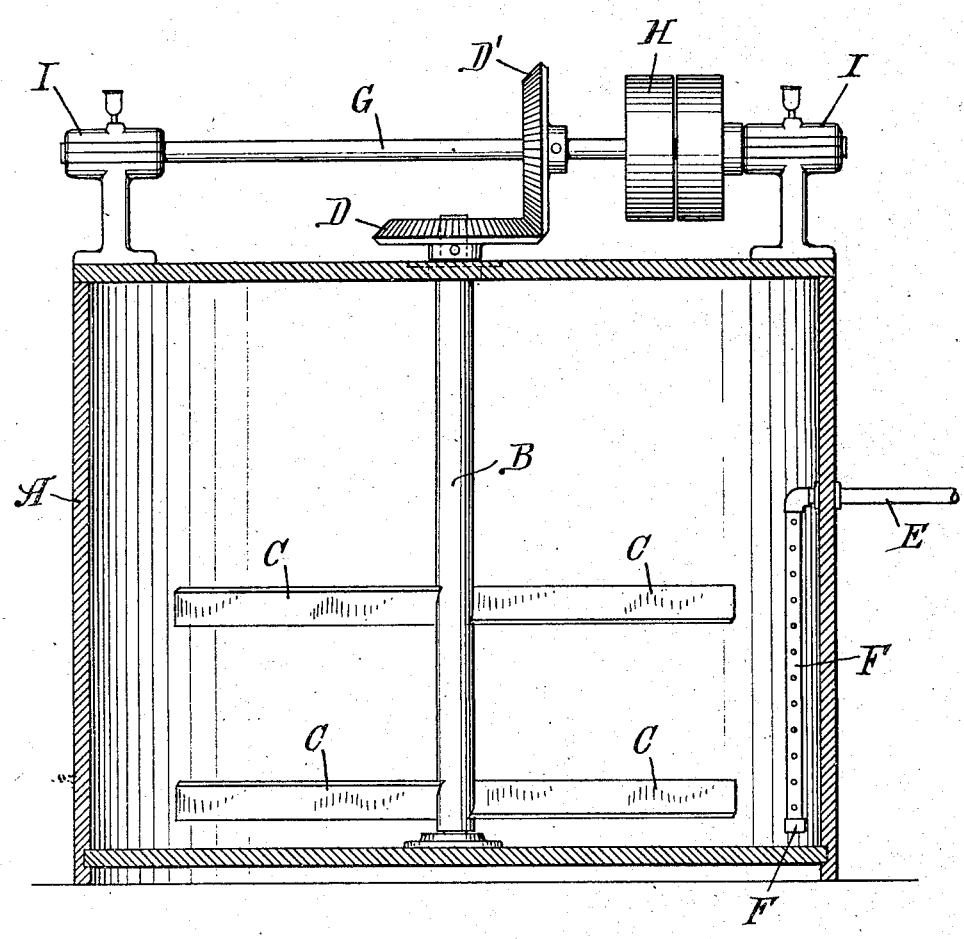
WITNESS
G. V. Rasmussen
INVENTOR
ANDREW A. DUNHAM
BY
ATTORNEYS Patented Jan. 6, 1925.

1,521,873

UNITED STATES PATENT OFFICE.

ANDREW A. DUNHAM, OF BAINBRIDGE, NEW YORK, ASSIGNOR TO THE CASEIN MANUFACTURING COMPANY, OF NEW YORK, N. Y., A CORPORATION OF VERMONT.

RENNET CASEIN AND PROCESS OF MAKING THE SAME.

Application filed January 24, 1924. Serial No. 688,138.

*To all whom it may concern:*

Be it known that I, ANDREW A. DUNHAM, residing at Bainbridge, Chenango County, State of New York, have invented an Improvement in Rennet Casein and Processes of Making the Same, of which the following is a specification.

My invention has for its object the production of rennet casein substantially free from acid, fat and lactose, and in the form of granules. Rennet casein, as ordinarily manufactured, is used for a number of purposes, including the coating of paper, as an adhesive in the manufacture of veneers and the joining of woodwork, and as a substitute for glue in the manufacture of a great many substances such as calcimine, wall finish, and in the textiles, carpet, paper-box, barrel lining, and kindred trades. Such casein is, however, not sufficiently free from acid, fat and lactose to make it suitable for food or medicinal products, or for other purposes necessitating an especially pure casein substantially free from such substances. It is the purpose of my invention to provide a process by means of which a rennet casein of great purity may be produced, that is to say, one substantially free from acid, fat and lactose, light in color and practically free from odor, and in the form of granules, without great expense. My process comprises, generally speaking, the treatment of skim milk, to which rennet extract has been added, by simultaneous agitation and heating with steam injected directly into the fresh casein, the temperature to which the substance is subjected and the degree of agitation being such that the casein will be converted into relatively coarse granules and will not coalesce and form large masses but will remain, even after washing and pressing, in a fine granular condition and will be practically free from acid, fat and lactose.

The following is an example of my process:

5000 pounds of skim milk are placed into a container provided with an agitating device and means for injecting live steam. The milk is heated to from 85–90° F. by injecting live steam directly thereinto, and after the desired temperature has been attained sufficient rennet extract is added to thicken or set the mass in a period of from five to ten minutes. The quantity of rennet extract used depends upon the quality of the skim milk; one pound of rennet extract is usually sufficient for the quantity stated, but I prefer to add two pounds of such extract in order to hasten the process. As soon as the milk has thickened or set I immediately agitate the thickened mass in a uniform and continuous manner and at the same time, by means of live steam, injected into the mass, gradually over the space of about half an hour, increase the temperature to 170° F. After this temperature has been reached I discontinue agitation and the addition of further steam and allow the fine casein to settle to the bottom of the tank. When the casein has settled the whey is drawn off, water is run into the mixer until the casein is well covered, and the contents of the mixer agitated for about twenty minutes, the curd being then allowed to settle and the wash-water drawn off as completely as possible. This washing operation may be repeated once, twice, or more times, according to the degree of purity of the casein desired. The curd is then removed from the vat, pressed for a short time to remove excessive water, spread upon trays and dried in the usual manner.

The simultaneous heating with direct steam and agitation of the casein produces a curd which, instead of forming a soft lumpy mass, consists of substantially uniform particles of casein of about the size of coarse granulated sugar, a condition which it will retain even after washing and pressing. This casein will be substantially free from acid, fat and lactose.

As is well known to those skilled in the art, milk shows great variations in regard to quality, particularly acidity, and it is, therefore, impossible to state a formula which will give the best results with all classes of milk. Of course, enough rennet should be used with any given quantity of milk to produce a complete coagulation of the casein, but more rennet than this may be used, if desired, to hasten the process of casein formation. The temperature which I have found best is in the neighborhood of 170° F., but a good quality of product may be obtained by heating at a lower or higher temperature, so long as the heat is sufficient to prevent the particles from coalescing when they settle to the bottom of the vat, and is not so high as to cook the casein into a solid mass. When in my claim I speak of a temperature of approximately 170° F. I intend to cover the range indicated as an equivalent thereof.

In order to disclose my process as fully as possible I show in the accompanying drawing a container equipped for the operation of my process, the parts being shown drawn to scale. In such drawing A represents a round container, provided with a vertical shaft B carrying paddles or agitators C. Suitable means are provided for rotating the shaft B, for instance bevel gear wheels D, D' and associated driving shaft G, pulley H and bearings I. A steam pipe E passing through the shell A is provided with a perforated end piece F for the purpose of injecting steam directly into the milk in the form preferably of fine sprays or jets. If a round container, having the proportions shown in the drawing be built with eight feet interior diameter and four feet interior height it will be found suitable for working 5000 pounds of skim milk according to the specific example hereinabove given. Good results will be obtained if the vertical shaft B is equipped with two sets of paddles of two blades each, one set of paddles very close to the bottom and the other set about eighteen inches above the bottom, both paddles, running in the same direction and at a rate of about 60 R. P. M. If pipe E, with its perforated end piece F, is placed as shown in the drawing, it will be always below the level of the liquid within the container, a condition which will prevent burning of the solids in the milk with resultant contamination of the end product by scorched particles.

I claim:

The process of treating rennet casein for the purpose of removing therefrom substantially all of its acid, fat and lactose content, which comprises agitating the same in the presence of water while gradually heating to a temperature of approximately 170° F., by the means of steam injected directly thereinto, for such a length of time that the resulting product is brought into the form of coarse granules, substantially as and for the purpose described.

In testimony whereof I have hereunto set my hand.

ANDREW A. DUNHAM.